United States Patent [19]

Tsuchida

[11] Patent Number: 5,420,641
[45] Date of Patent: May 30, 1995

[54] PARENT-PICTURE AND CHILD-PICTURE DISPLAY APPARATUS

[75] Inventor: Susumu Tsuchida, Tokyo, Japan

[73] Assignee: Sony Corporation, Tokyo, Japan

[21] Appl. No.: 1,277

[22] Filed: Jan. 7, 1993

[30] Foreign Application Priority Data

Jan. 1, 1992 [JP] Japan .................. 4-018539

[51] Int. Cl.[6] .............. H04N 5/46; H04N 5/44; H04N 5/45
[52] U.S. Cl. .................. 348/556; 348/555; 348/565; 348/567
[58] Field of Search ............... 348/567, 566, 565, 564, 348/555, 558, 563, 557, 556, 554, 588, 589, 598, 599, 584, 722, 568, 443, 444, 445, 447, 458, 604, 449, 459, 513, 536, 550, 526, 715, 716, 718, 719, 553; H04N 5/46, 5/45, 5/445, 5/44, 5/262, 5/265

[56] References Cited

U.S. PATENT DOCUMENTS

| | | | |
|---|---|---|---|
| 4,249,213 | 2/1981 | Imaide et al. | 348/567 |
| 4,811,103 | 3/1989 | Casey | 348/567 |
| 5,065,243 | 11/1991 | Katagiri | 348/556 |
| 5,130,800 | 7/1992 | Johnson et al. | 348/564 |
| 5,132,793 | 7/1992 | Hirahata et al. | 348/556 |
| 5,168,362 | 12/1992 | Yoshida | 348/445 |
| 5,208,660 | 5/1993 | Yoshida | 348/567 |
| 5,289,284 | 2/1994 | Ersoz et al. | 348/567 |

FOREIGN PATENT DOCUMENTS

| | | | |
|---|---|---|---|
| 0304236 | 2/1989 | European Pat. Off. | H04N 5/45 |
| 0447167 | 9/1991 | European Pat. Off. | H04N 5/44 |
| 5183833 | 7/1993 | Japan | H04N 5/45 |

OTHER PUBLICATIONS

Tsuchida et al., Multi-picture System for High Resolution Wide Aspect Ratio Screen, *IEEE Transactions on Consumer Electronics*, vol. 37, No. 3, Aug. 1991, pp. 313–319, New York, U.S.

Tsuchida et al., Multi-picture System for High Resolution Wide Aspect Ratio Screen, *IEEE 1991 International Conference on Consumer Electronics, Digest of Technical Papers*, Jun. 5, 1991, pp. 252–253, Rosemont, U.S.

*Primary Examiner*—James J. Groody
*Assistant Examiner*—Safet Metjahic
*Attorney, Agent, or Firm*—Jay H. Maioli

[57] ABSTRACT

A display apparatus comprising a field frequency converter for converting the field frequency of a parent-picture video signal; an aspect ratio converter for converting the aspect ratio of the video signal after the field frequency conversion; a child-picture processor for generating a child-picture video signal; and a switch for synthesizing the aspect-converted video signal with the video signal obtained from the child-picture processor. In one embodiment, the storage capacity of a memory required in the field frequency converter can be minimized. The apparatus further comprises a selector for selecting either the parent-picture video signal of the second aspect ratio or the parent-picture video signal of the first aspect ratio which has been converted to the second aspect ratio, wherein merely one switch is sufficient for synthesizing the video signal obtained from the child-picture processor with the selected parent-picture video signal of the second aspect ratio.

3 Claims, 16 Drawing Sheets

F I G. 2(a)
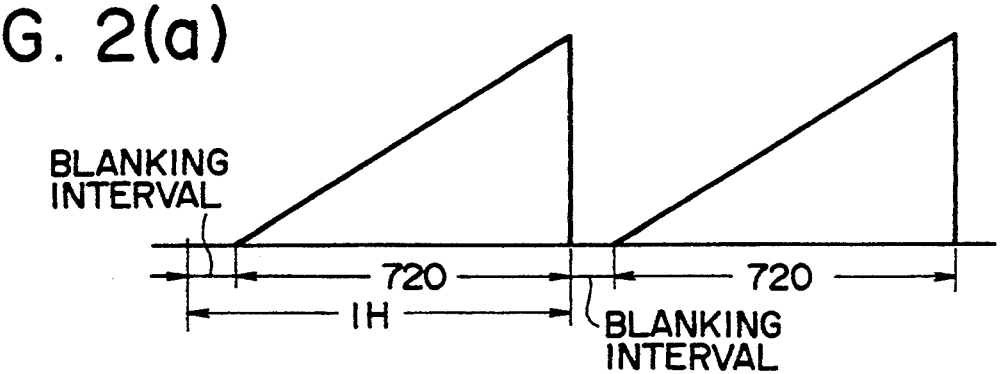
F I G. 2(b)
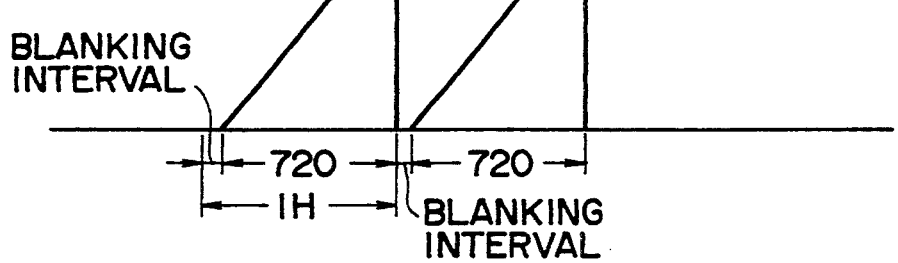
F I G. 2(c)
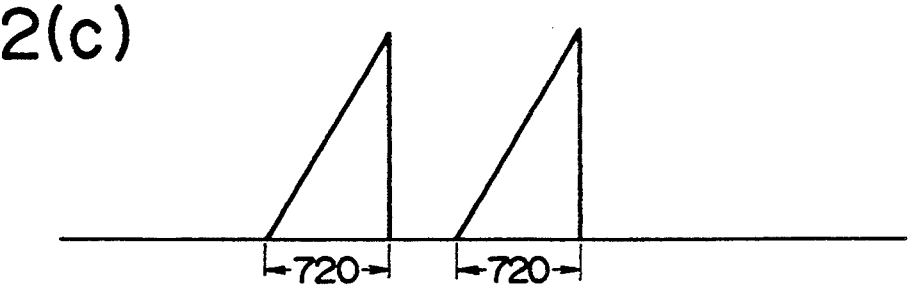
F I G. 2(d)
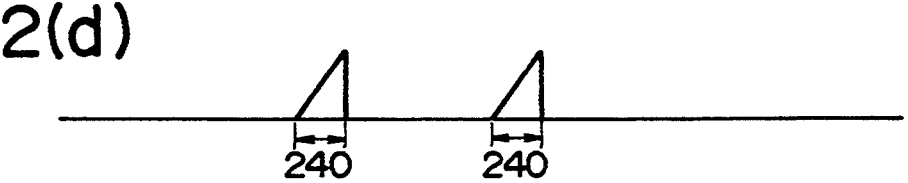
F I G. 2(e)
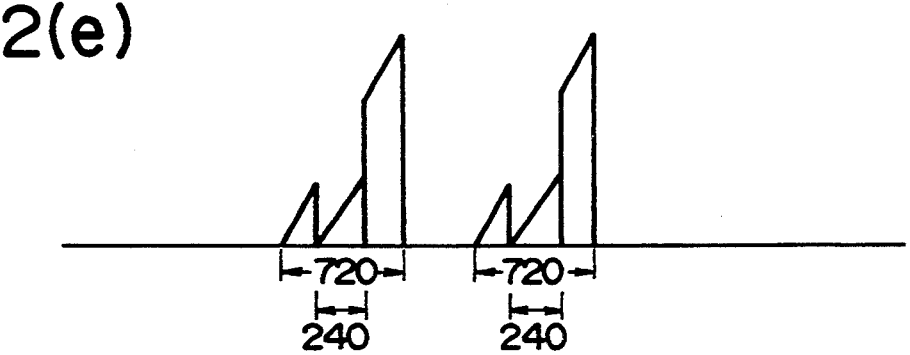

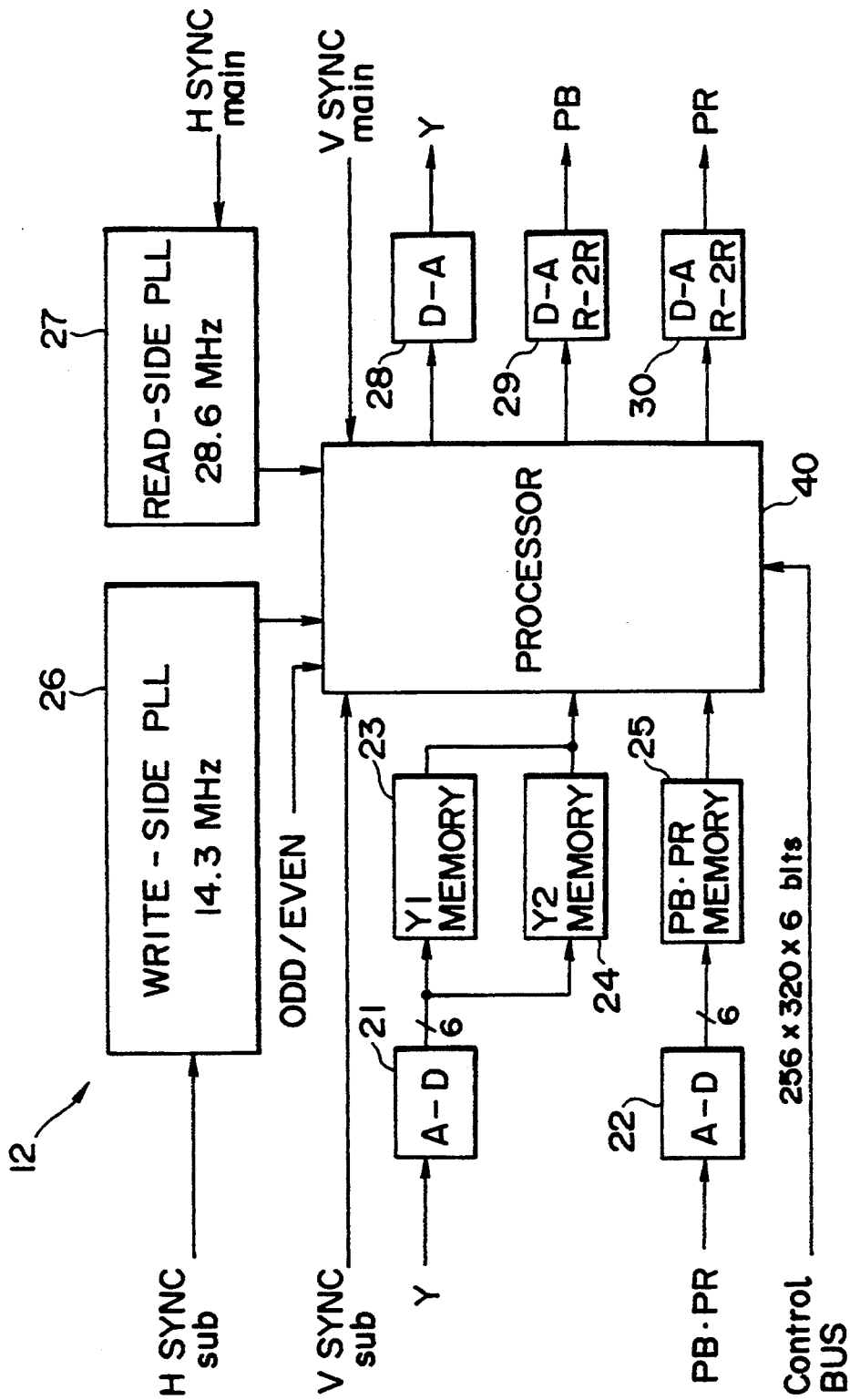
F I G. 3

F I G. 4(A)
WRT area
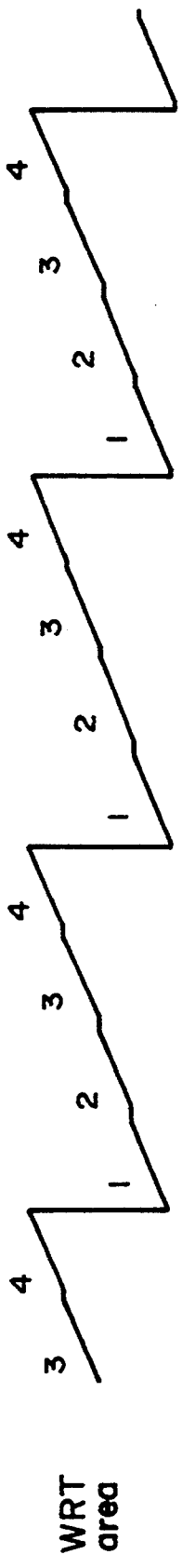
F I G. 4(B)
READ area
HOW TO AVERT PASSING OF MEMORY ADDRESS IN AREA 3
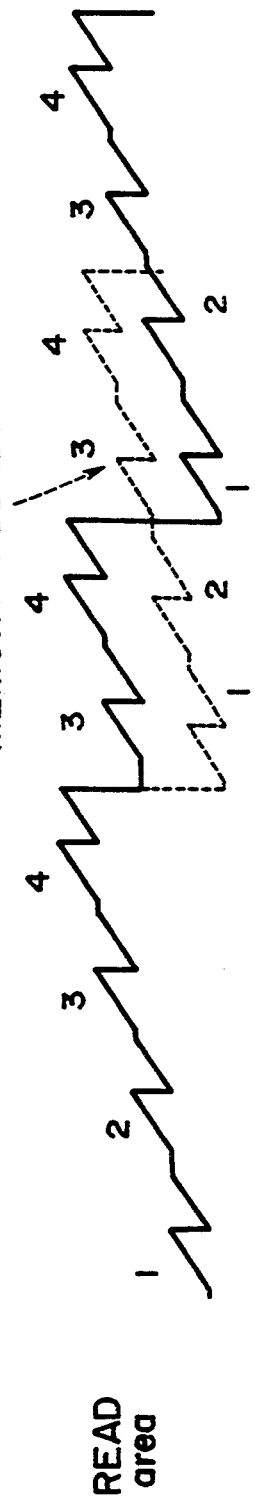
F I G. 4(C)
MEMORY AREAS IN 4-FIELD SEQUENCE
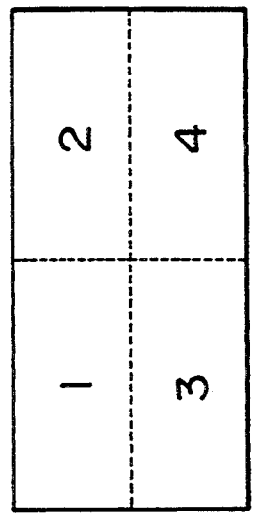
256 × 2 = 512 dots
160 × 2 = 320 lines

FIG. 8(A) AND
FIG. 8(B) SOCY 1
FIG. 8(C) SOCY 2
FIG. 8(D) SDE

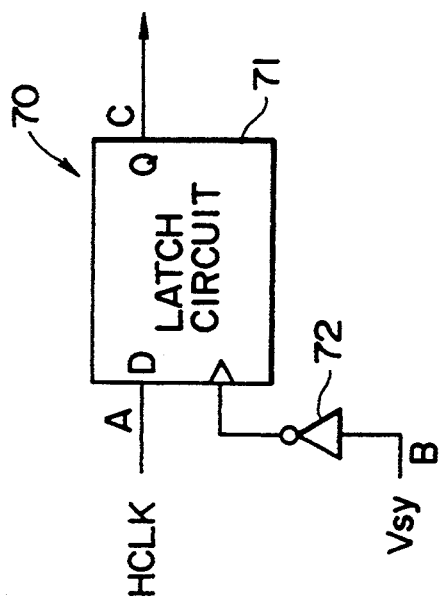
FIG. 9
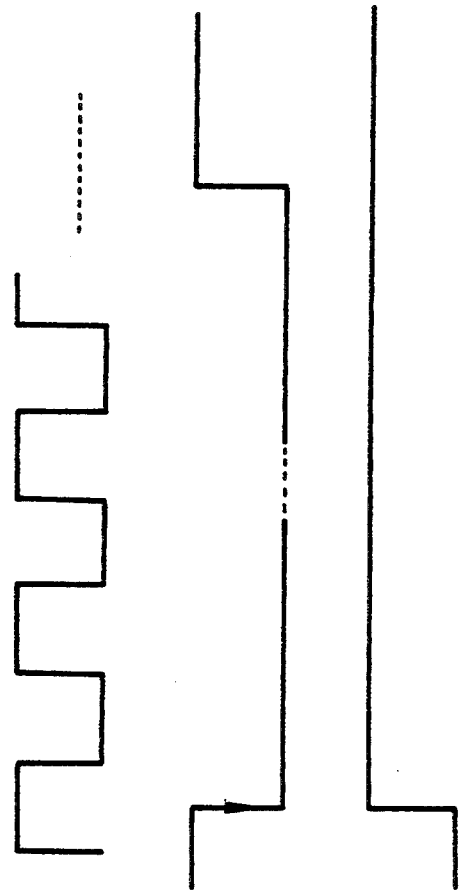
FIG. 10(A) HCLK
FIG. 10(B) Vsy
FIG. 10(C) Q

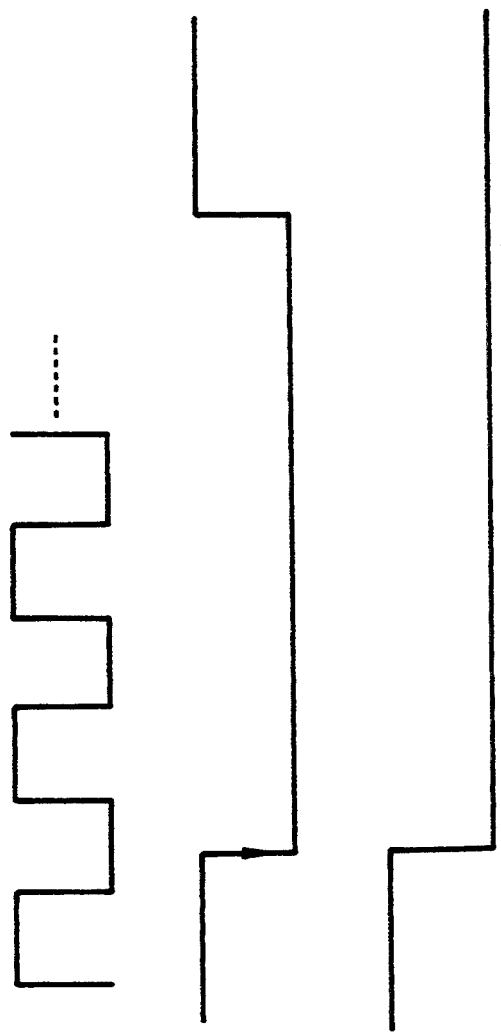

Pout P

CHANNEL INDEXES

PinP IN ZOOM MODE

4:3 OR 16:9

PinP

ODD

313H

ODD 312.5H

EVEN

312H

EVEN 312.5H

PARENT-PICTURE AND CHILD-PICTURE DISPLAY APPARATUS

BACKGROUND OF THE INVENTION

1. Field of the Invention

The present invention relates to a display apparatus having a picture-in-picture or picture-out-picture function for superimposing a sub picture on a main picture being displayed on a screen of a television receiver or the like.

2. Description of the Conventional Technique

FIGS. 12(A)–12(D) show some examples where a sub picture is displayed in a predetermined area of a main picture. In FIG. 12(A), a main picture is displayed in a left portion of a screen, and one sub picture is displayed at its lower right end. Next in FIG. 12(B), there are displayed three sub pictures of individually different channels. In this example, the images of three channels are visually represented as indexes. The display method employed in the above two examples is generally termed PoutP (picture-out-picture) since any sub picture is positioned at the end portion of the main picture.

Meanwhile in FIGS. 12(C) and (D) is employed another display method termed PinP (picture-in-picture). In the example (C), a main picture is displayed in a zoom mode with its upper and lower end portions cut and a sub picture is displayed with partial insertion in the lower right area of the main picture. Further in the example (D), sub pictures are displayed at the four corner areas of the main picture respectively.

FIG. 13 is a circuit block diagram of a conventional display apparatus for superimposing a sub picture on a parent-picture as mentioned. In this example, a mixer 101 mixes a sub picture signal with a main picture signal and supplies the mixed signal to an aspect ratio converter 102. Then the aspect ratio converter 102 converts the aspect ratio of the input signal and supplies its output to a double speed converter 103, which converts the input video signal into a double speed signal and outputs the same to a mixer 105 via a switch 104. Subsequently the mixer 105 delivers the input video signal from the double speed converter 103 directly as an output, or mixes a sub picture signal with the input main picture signal of HD-MAC format received via the switch 104 and then outputs the mixed signal therefrom.

Now the operation of the above conventional apparatus will be described below with reference to a timing chart of FIGS. 14(a)–14(e). The mixer 101 is supplied with the parent-picture and child-picture video signals of the PAL or NTSC system. The substantial picture signal included in such composite video signal is so set as to have, e.g., 720 pixels per horizontal scanning period H. The mixer 101 curtails the pixels of the sub picture to, e.g., 240. And the data of the 240-pixel sub picture (FIG. 14(b)) is inserted in a predetermined region of the 720-pixel main picture (FIG. 14(a)) to thereby produce a new video signal (FIG. 14(c)).

The data thus obtained is converted by the aspect ratio converter 102 into a signal of a desired aspect ratio. More specifically, in case the aspect ratio of a display unit (not shown) connected to the rear stage of the mixer 105 is 16:9, the video signal of an aspect ratio 4:3 supplied from the mixer 101 is converted into a video signal of an aspect ratio 16:9 (FIG. 14(d)). The converted video signal is inputted to the double speed converter 103, which then produces a video signal of a double field frequency converted as shown in FIG. 14(e). The video signal thus produced is supplied via the switch 104 to the mixer 105, from which the signal is directly outputted to and represented visually on the display unit.

FIG. 15 shows the principle of such double speed conversion. The PAL or NTSC video signal is in a 2:1 interlaced format of 625 lines at 50 Hz, and its aspect ratio is set to 4:3. The one-frame video signal of 625 H consists of two video signals of an odd field and an even field each composed of 312.5 H. The double speed converter 103 produces, out of the odd-field video signal, two double-frequency odd-field video signals of 313 H and 312.5 H. The converter 103 further produces two even-field video signals of 312H and 312.5H by doubling the frequency of the even-field signal of 312.5H.

Consequently, as shown in FIGS. 16(a)–16(d), the odd-field video signal of 312.5H is displayed in succession to the odd-field video signal of 313H. And subsequently the even-field video signal of 312H is displayed, which is followed by the even-field video signal of 312.5H. Since the field frequency is doubled as mentioned, it becomes possible to prevent occurrence of flicker.

Meanwhile the HD-MAC video signal based on the European HD TV standard is in a 2:1 interlaced format of 1250 lines at 50 Hz, and its aspect ratio is set to 16:9. In case the HD-MAC video signal is used for a main picture, it is impossible to employ the mixer 101 in common to the PAL or NTSC system and the HD-MAC system since the number of lines in the former and that in the latter are fundamentally different from each other. Therefore, in using the HD-MAC video signal for a main picture, the circuit configuration is so contrived that the parent-picture video signal is supplied to the mixer 105 via the switch 104, and a child-picture signal is mixed with the parent-picture signal in the mixer 105.

In displaying a sub picture to a main picture in the PoutP mode, a child-picture video signal of 240 pixels is added to a parent-picture video signal of 720 pixels, as shown in FIG. 17(a). It follows therefrom that the length of the mixed signal is rendered greater than the length of 1H. Accordingly, for double speed conversion of such signal, there exists the necessity of providing two field memories in the double speed converter and writing the data therein alternately per line. For this purpose, memories for the data of two fields are required to consequently raise a problem with regard to an increase of the production cost. In an attempt to eliminate such disadvantage, the video signal shown in FIG. 17(a) is so processed that its aspect ratio is converted as shown in FIG. 17(b) to remove the overlap on the time base, and then double speed conversion is executed. This process enables a single field memory to be sufficient for the double speed conversion.

However, since the number of pixels of the 1H data inputted to the double speed converter 103 is 960 (=720 +240), the storage capacity of the memory employed in the double speed converter 103 needs to be 4/3 (=960/720) times in comparison with 720 pixels required for the display in the picture-in-picture mode. Consequently the problem of the high production cost is still left unsolved.

Furthermore, in one case of using the HD-MAC video signal for a main picture and another case of using the NTSC or PAL video signal for a main picture, the numbers of lines in such two cases are widely different from each other to eventually fail in achieving common use of the circuit which mixes a sub picture with a main picture, whereby circuits of two systems are needed and increase the production cost.

In addition, if the frequency-converted video signals are employed for discrimination between the odd and even fields of the video signals after conversion of the field frequency, it becomes necessary to discriminate among 312.5H, 313H, 312.5H and 312H, to consequently requiring a greater circuit scale, hence causing difficulties in realization of stable discrimination.

OBJECT AND SUMMARY OF THE INVENTION

The present invention has been accomplished in view of the circumstances mentioned above. Its object resides in providing an improved display apparatus which is capable of minimizing the storage capacity of a memory required for field frequency conversion and further reducing the number of mixer circuits with another advantage of ensuring stable discrimination between even and odd fields.

According to a first aspect of the present invention, there is provided a display apparatus comprising a flicker-free processor as a field frequency converter means for converting the field frequency of a parent-picture video signal; an aspect converter as an aspect ratio converter means for converting the aspect ratio of the video signal of which field frequency has been converted by the flicker-free processor; a processor as a child-picture processor for generating a child-picture video signal; and a switch as a synthesizer means for synthesizing a new signal from the video signal of which aspect ratio has been converted by the aspect converter and the video signal obtained from the child-picture processor. In this display apparatus, the field frequency of the parent-picture video signal is converted by the flicker-free processor, and then the child-picture video signal is synthesized therewith. Consequently the storage capacity of the memory required in the processor can be minimized.

According to a second aspect of the present invention, there is provided a display apparatus comprising a flicker-free processor as a field frequency converter means for converting the field frequency of a parent-picture video signal having a first aspect ratio of, e.g., 4:3; an aspect converter as an aspect ratio converter means for converting the aspect ratio 4:3 of the video signal, of which field frequency has already been converted by the flicker-free processor, to a second aspect ratio of, e.g., 16:9; a switch as a selector means for selecting either the parent-picture video signal of the aspect ratio 4:3 or the parent-picture video signal of which aspect ratio has been converted by the aspect converter from 4:3 to 16:9; and a switch as a synthesizer a new signal from means for synthesizing the video signal obtained from the flicker-free processor with the video signal of the aspect ratio 16:9 selected by the first-mentioned switch. In this display apparatus, first the aspect ratio of the parent-picture video signal is converted by the aspect converter, and then the child-picture video signal obtained from the processor is synthesized with the parent-picture video signal. Therefore, any desired video signal of the aspect ratio 16:9 can be selected by the first-mentioned switch and supplied to the synthesizer switch. As a result, merely one switch is sufficient for synthesizing the sub picture with the main picture.

According to a third aspect of the present invention, there is provided a display apparatus comprising a flicker-free processor as a field frequency converter means for converting the field frequency of a parent-picture video signal; memories as storage means for storing a child-picture video signal; a switch as a synthesizer means for synthesizing a new signal from the child-picture video signal read out from the memories with the parent-picture video signal of which field frequency has already been converted; a detection circuit as a field detector means for detecting the odd fields and the even fields with respect to the parent-picture video signal prior to the field frequency conversion; and a processor as a control means for controlling the reading from the memories in accordance with the output of the detection circuit. In this display apparatus, discrimination between the odd fields and the even fields can be executed on the basis of the parent-picture video signal prior to the field frequency conversion and the operation of reading out the signal from the memories is controlled in accordance with the result of such discrimination. Consequently the discrimination between the odd and even fields can be performed with accuracy, and the circuit configuration for such control can be simplified.

The above and other features and advantages of the present invention will become apparent from the following description which will be given with reference to the illustrative accompanying drawings.

BRIEF DESCRIPTION OF THE DRAWINGS

FIGS. 2(a)–2(e) are timing charts of signals for explaining the operation of the embodiment shown in FIG. 1;

FIG. 3 is a block diagram of a PinP processor employed in the embodiment of FIG. 1;

FIGS. 4(A)–4(C) are timing charts of signals for explaining the operation of the PinP processor shown in FIG. 3;

FIG. 9 is a block diagram showing the construction of a detector included in the PinP processor of FIG. 1;

FIGS. 10(A)–10(C) are timing charts of signals for explaining the operation of the detector shown in FIG. 9;

FIGS. 11(A)–11(C) are other timing charts of signals for explaining the operation of the detector shown in FIG. 9;

DESCRIPTION OF THE PREFERRED EMBODIMENTS

Figure 1:
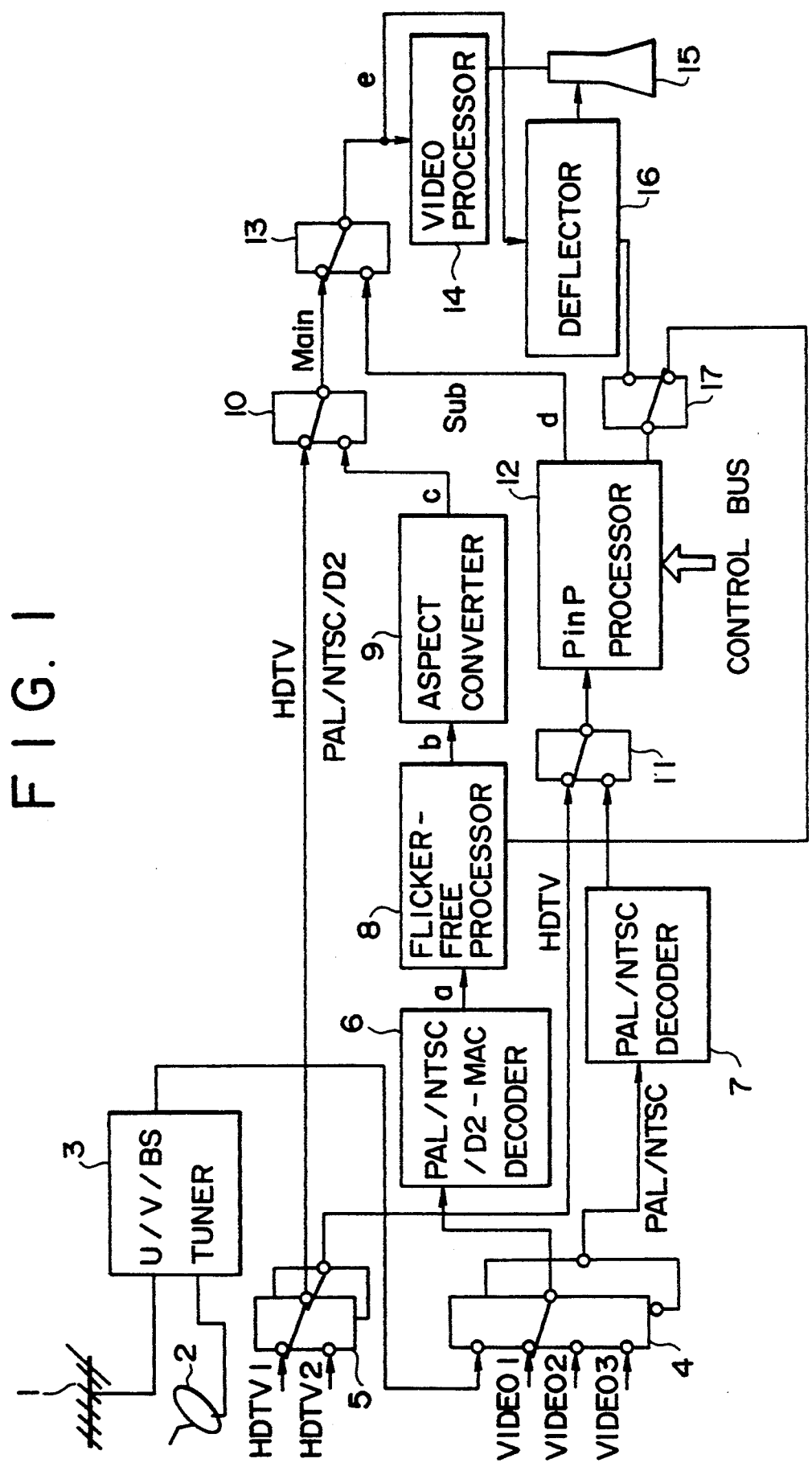
FIG. 1 is a block diagram of an embodiment representing the display apparatus of the present invention.

FIG. 1 is a block diagram showing the construction of an exemplary embodiment which represents the display apparatus of the present invention. An antenna 1 serves to receive UHF and VHF television broadcast waves, while an antenna 2 serves to receive satellite broadcast waves. A tuner 3 receives the outputs of the antennas 1, 2 and supplies its detected output to one input terminal of a switch 4, to which are also supplied, in addition to the output of the tuner 3, video signals 1 through 3 from an VTR, not shown, or the like. The switch 4 selects one of the inputs supplied thereto and delivers the selected signal to decoders 6 and 7.

The decoder 6 decodes the parent-picture video signal supplied from the switch 4 and outputs the decoded signal to a flicker-free processor 8. In this embodiment, the decoder 6 is so formed as to be capable of decoding any of PAL, NTSC and D2-MAC video signals. The flicker-free processor 8 serves to double the field frequency of the video signal supplied from the decoder 6 and outputs the frequency-converted signal. And an aspect converter 9 converts the aspect ratio of the input frequency-doubled video signal to 16:9 in the case where the ratio thereof is 4:3. When the aspect ratio of the input video signal is 16:9, the signal is outputted directly without any conversion of the aspect ratio.

A switch 5 selects one of HD TV signals of the HD-MAC format and so forth supplied from an apparatus, now shown, and outputs the selected signal to switches 10 and 11. The switch 10 selects either the video signal supplied from the switch 5 or the video signal from the aspect converter 9, and supplies the selected signal to one input terminal of a switch 13. More specifically, the aspect ratio of the video signal supplied to each input terminal of the switch 10 is so processed as to be 16:9. Therefore the video signal supplied to one input terminal of the switch 13 always has an aspect ratio of 16:9.

Meanwhile the decoder 7 decodes the video signal selected by the switch 4 and supplies the selected signal to the other input terminal of the switch 11. As described above, the HD TV video signal selected by the switch 5 is supplied to one terminal of the switch 11. Therefore the switch 11 selects one of the input signals and outputs the same to the PinP processor 12, which then generates a child-picture video signal from the input video signal. For generating such child-picture video signal, the processor 12 detects a vertical synchronizing signal and a vertical synchronizing signal from the parent-picture video signal supplied thereto via the switch 10.

The child-picture video signal obtained from the processor 12 is supplied to the other input terminal of the switch 13. The switch 13 is changed at a predetermined timing to the upper or lower position in FIG. 1 and synthesizes the child-picture video signal, which is supplied from the processor 12, with the parent-picture video signal obtained from the switch 10, and then delivers the synthesized signal to a video processor 14. Subsequently the video signal processed by the video processor 14 is outputted to and displayed on a CRT 15 which has an aspect ratio of 16:9.

A deflector 16 detects the vertical and horizontal synchronizing signals from the output of the switch 13 and controls the scanning on the CRT 15 in accordance with the detected signals. A switch 17 selects the vertical and horizontal synchronizing signals included in the video signal outputted from the flicker-free processor 8 or the deflector 16 prior to the field signal conversion and delivers the selected signals to the processor 12.

In this embodiment, the main picture video signal is supplied to the switch 10 via the decoder 6, the processor 8 and the aspect converter 9, or directly from the switch 5 without being passed through any of such circuits. The child-picture video signal is processed by the processor 12 independently of the main picture. Therefore, no fundamental difference exists between the operation in the PinP mode and that in the PoutP mode, and the difference is concerned merely with the switching timing of the switch 13.

FIGS. 2(a)-2(e) are timing charts for explaining the one-line operation in synthesizing the child-picture video signal with the parent-picture video signal. The parent-picture video signal shown in FIG. 2(a) is such that the number of pixels during the time of the effective video signal out of the 1 H period is set to 720. Such video signal is supplied from the decoder 6 to the processor 8, which then converts the input signal into a video signal of FIG. 2(b) having a double field frequency. This frequency conversion is performed by reading out the data of 720 pixels in conformity with clock pulses of a double frequency. As far as this process is concerned, there is no difference between the PinP mode and the PoutP mode as described, so that the required storage capacity of the memory incorporated in the processor 8 corresponds merely to the data of one field.

The video signal, of which field frequency has been doubled by the flicker-free processor 8, is then supplied to the aspect converter 9 where a video signal of FIG. 2(c) is produced with its aspect ratio so converted as shown. Meanwhile in the processor 12, there is generated a child-picture video signal composed of 240 pixels as shown in FIG. 2(d). The switch 13 is changed to the upper position in FIG. 1 when selecting the parent-picture video signal, or is changed to the lower position in the same diagram when selecting the child-picture video signal. Consequently, the video signal outputted from the switch 13 is such as shown in FIG. 2(e) where the effective video signal per line of the synthesized parent and sub pictures is composed of 720 pixels.

FIG. 3 shows a further detailed construction of the processor 12 employed in the apparatus of FIG. 1. The luminance (Y) signal in the child-picture video signal outputted from the switch 11 is supplied to an A-D converter 21 and, after analog-to-digital conversion, the resultant digital signal is written pixel by pixel in memories 23 and 24 alternately. Meanwhile the color difference signals PB and PR are supplied to an A-D converter 22 and, after analog-to-digital conversion, the digital signals are written in a memory 25. The child-picture horizontal synchronizing signal is supplied to a write-side PLL 26, which then generates write clock pulses of a frequency 14.3 MHz in synchronism with the horizontal synchronizing signal. A processor 40 controls the operation of writing in the memories 23 to 25 in synchronism with the write clock pulses obtained from the PLL 26. To the memories 23 to 25, there are inputted the data of 320 lines each composed of 256 pixels. And each of such pixels consists of 6 bits.

Meanwhile a read-side PLL 27 generates pulses of a frequency 28.6 MHz (double the frequency of the write clock pulses generated by the write-side PLL 26) synchronized with the horizontal synchronizing signal included in the parent-picture video signal inputted from the switch 17, and then supplies such double-frequency pulses to the processor 40, to which the vertical synchronizing signal of the parent-picture video signal is also supplied from the switch 17. The processor 40 reads out the data from the memories 23 to 25 in synchronism with the input signals. Out of the data thus read, the luminance signal component is supplied to a D-A converter 28 and, after digital-to-analog conversion, the luminance signal is outputted therefrom. The color difference signal PB is supplied to a D-A converter 29 for digital-to-analog conversion, while the other color difference signal PR is supplied to a D-A converter 30 for digital-to-analog conversion. The signals thus converted are outputted from the converters 29 and 30 respectively.

When the first pixel data of the luminance signal is written in the memory 23 for example, the next second pixel data thereof is written in the memory 24. Thereafter the luminance signal is written pixel by pixel alternately in such a manner that the third pixel data is written in the memory 23, and then the fourth pixel data in the memory 24. Consequently, as shown in FIG. 4(C), the first-frame data is composed of the first-field data of 128 dots×160 lines written in the area 1 and the second-field data of 128 dots×160 lines written in the area 2. Similarly, the second-frame data is composed of the first-field data of 128 dots×160 lines written in the area 3 and the second-field data of 128 dots×160 lines in the area 4. Such writing operation is performed sequentially and continuously in the order of the areas 1-2-3-4-1-2-3-4 and so forth as shown in FIG. 4(A).

In contrast with the above, the reading operation is performed initially in the order of the areas 1-2-3-4 as shown in FIG. 4(B) and, after repeated reading from the areas 3 and 4, the operation is continued in the order of the areas 1-2-3-4 again. Due to such repeated operation of reading the data from the areas 3 and 4 twice, it becomes possible to avert a trouble that the read address passes the write address.

The operation of reading out the data of four fields is controlled in conformity with the result of discrimination between the odd and even fields performed by the detector 70 shown in FIG. 9 which will be described later. More specifically, the data are read out from the areas 1 and 3 in response to detection of the odd fields by the detector 70, or from the areas 2 and 4 in response to detection of the even fields.

Figure 5:
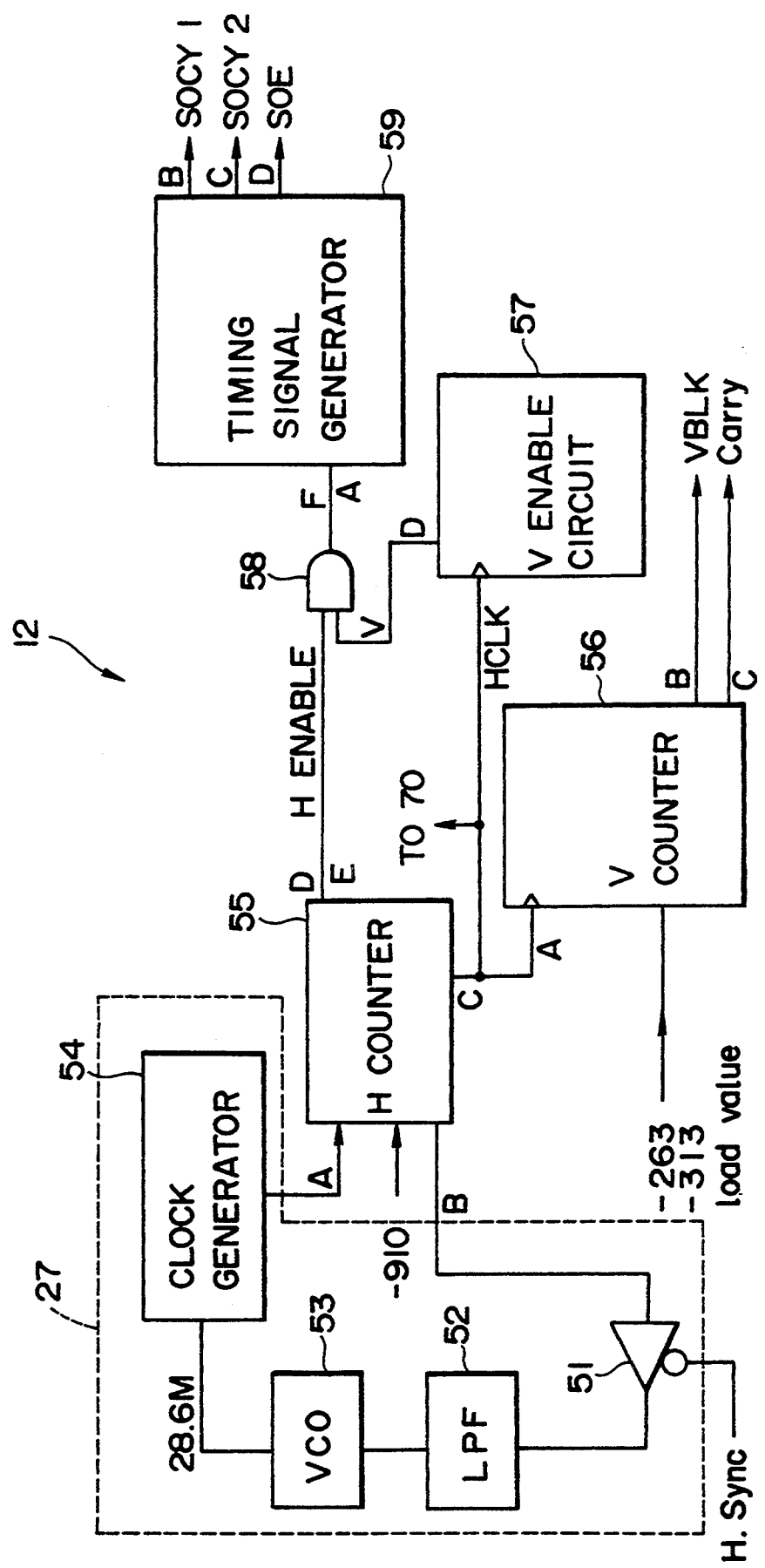
FIG. 5 is a block diagram of a reading circuit configuration of the PinP processor employed in the embodiment of FIG. 1.
Figure 6:
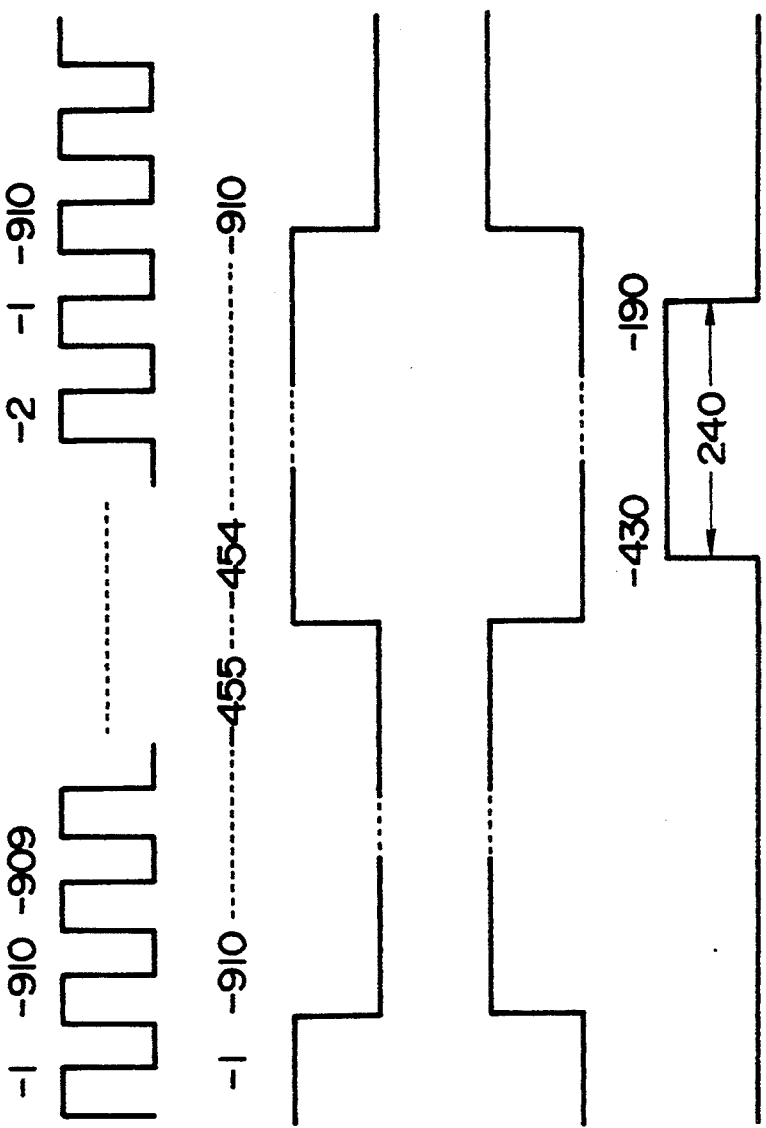
FIGS. 6(A)–6(D) are timing charts of signals for explaining the operation of the PinP processor shown in FIG. 5.

FIG. 5 shows an exemplary read-side construction of the processor 12 employed in the apparatus of FIG. 1. A read-side PLL 27 generates clock pulses synchronized with the horizontal synchronizing signal included in the parent-picture video signal supplied from the switch 17. More specifically, a clock generator 54 generates clock pulses of FIG. 6(A) and supplies the same to an H counter 55, where a value −910 is initially loaded at a predetermined timing. Thereafter the clock pulses supplied from the clock generator 54 are counted, and the count is incremented by 1 per pulse. A logical low-level signal is outputted when the count is in a range of −910 to −455, or a logical high-level signal is outputted when the count is in a range of −454 to −1, as shown in FIG. 6(B). The signal thus obtained is compared by a phase comparator 51 with the horizontal synchronizing signal included in the parent-picture video signal supplied from the switch 17. The resultant phase difference is first smoothened through a low-pass filter 52 and is supplied to a VCO (voltage-controlled oscillator) 53, which then generates clock pulses of a frequency (28.6 MHz) corresponding to the phase difference. The clock pulses thus obtained are supplied to the clock generator 54, which then generates the aforementioned clock pulses of FIG. 6(A) in synchronism with the input clock pulses.

The H counter 55 generates an HCLK signal of FIG. 6(C) whose phase is inverse to that of the signal shown in FIG. 6(B), and supplies such HCLK signal to both a V counter 56 and a V enable circuit 57. The H counter 55 further generates an H enable signal of FIG. 6(D) which is turned to a logical high level in response to a counted value of −430 to −190 or is turned to a logical low level in response to any other counted value. Such H enable signal is supplied to one input terminal of an AND gate 58.

Figure 7:
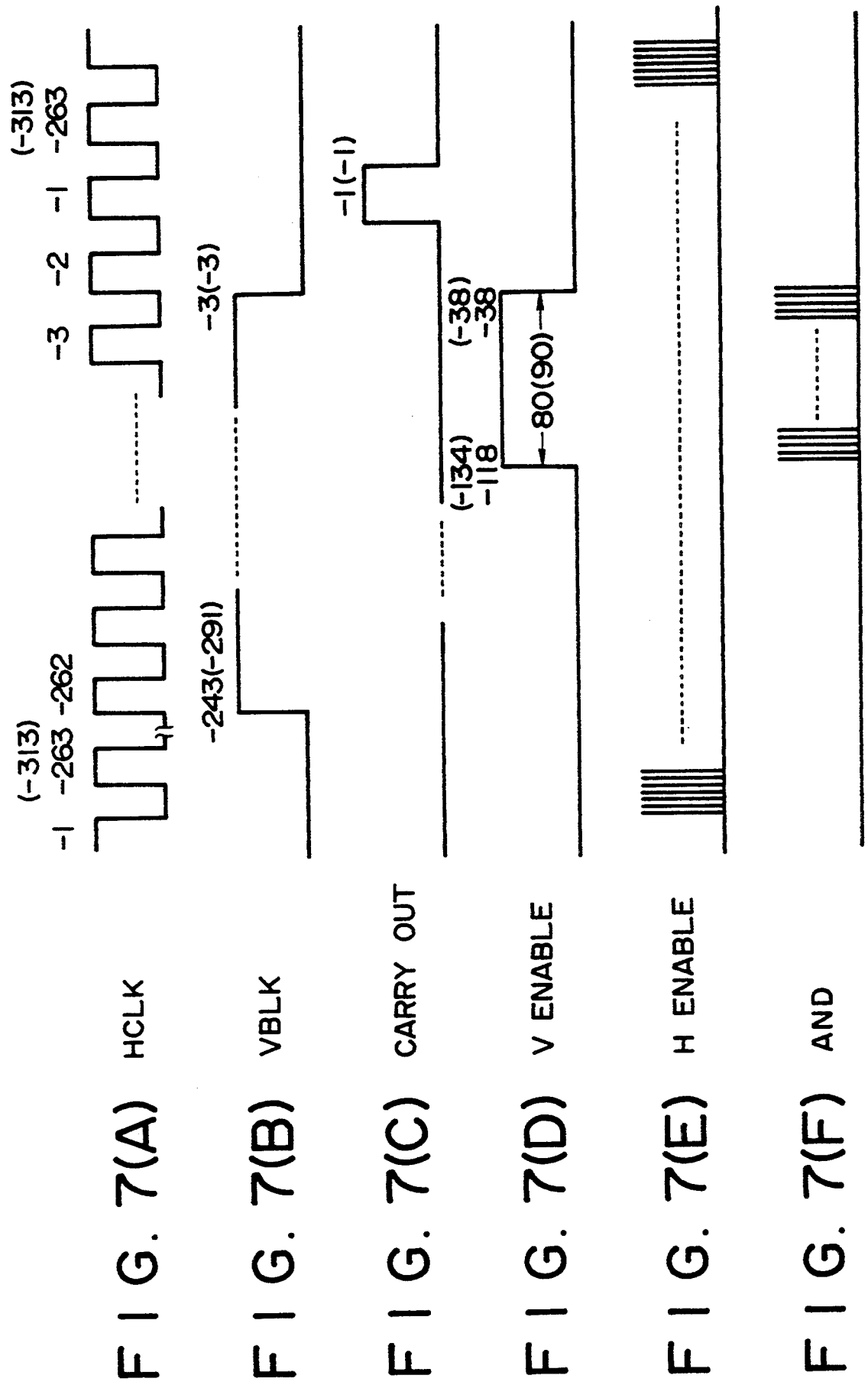
FIGS. 7(A)–7(F) are other timing charts of signals for explaining the operation of the PinP processor shown in FIG. 5.

The V counter 56 counts the HCLK signal of FIG. 7(A) supplied from the H counter 55. In the V counter 56, there is loaded a value −263 when the child-picture video signal is of the NTSC system, or a value −313 when such video signal is of the PAL system. And its count is incremented by 1 every time the HCLK signal is counted. The V counter 56 generates a VBLK signal of FIG. 7(B) which is turned to a logical high level when the counted value in the NTSC system ranges from −243 to −3 (or from −291 to −3 in the PAL system), or is turned to a logical low level when the count is any other value. This VBLK signal corresponds to the vertical blanking interval. When the counted value has reached −1, the V counter 56 generates a CARRY signal shown in FIG. 7(C).

Meanwhile the V enable circuit 57 counts the HCLK signal (FIG. 7(A)) and generates a V enable signal (FIG. 7(D)) which is turned to a logical high level when the counted value in the NTSC system ranges from −118 to −38 (or from −134 to −38 in the PAL system), or is turned to a logical low level when the count is any other value. Such V enable signal is supplied to one input terminal of an AND gate 58. Meanwhile to the other input terminal of the AND gate 58 is supplied the H enable signal (FIG. 7(E)) obtained from the H counter 55, and the AND gate 58 permits the H enable signal to pass therethrough during the supply of the high-level V enable signal from the V enable circuit 57.

Figure 8:
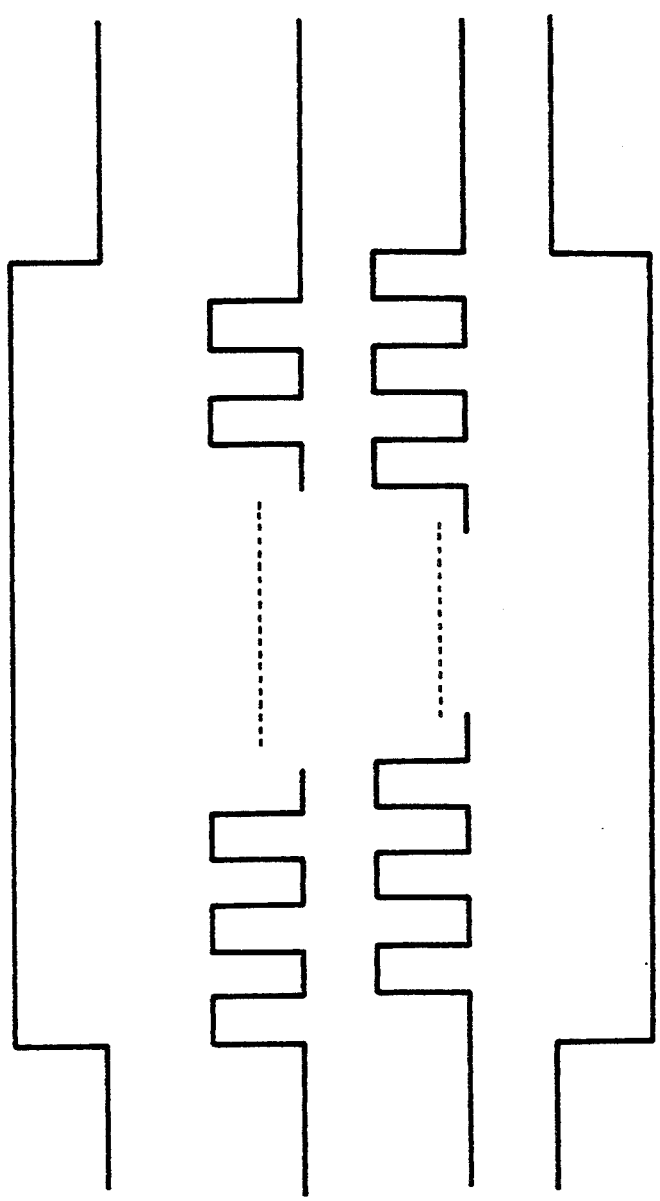
FIGS. 8(A)–8(D) are further timing charts of signals for explaining the operation of the PinP processor shown in FIG. 5.
Figure 12A:
FIGS. 12(A) through (D) illustrate examples of display modes where a sub picture is superimposed on a main picture.
Figure 12B:
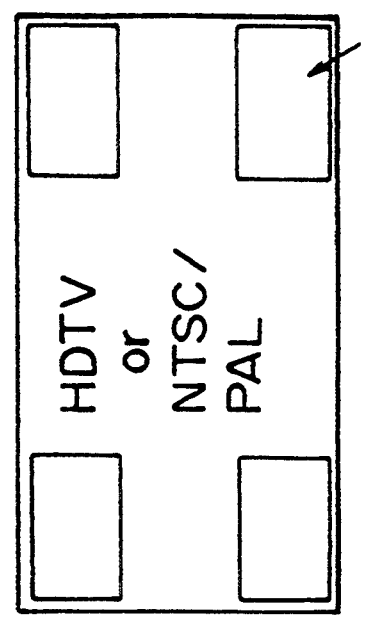
Figure 12C:
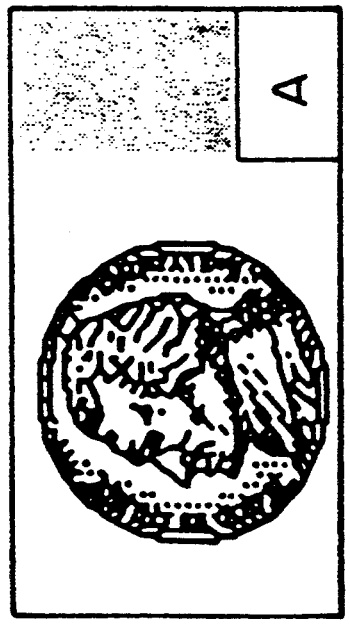
Figure 12D:
Figure 13:
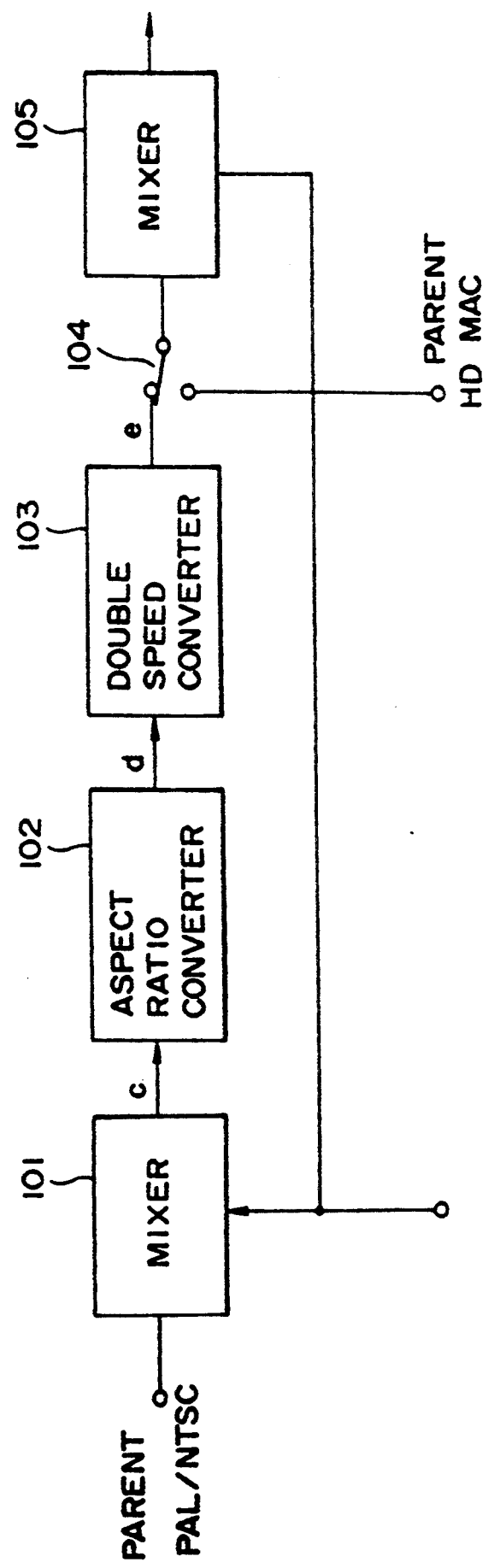
FIG. 13 is a block diagram of an exemplary conventional display apparatus.
Figure 14A:
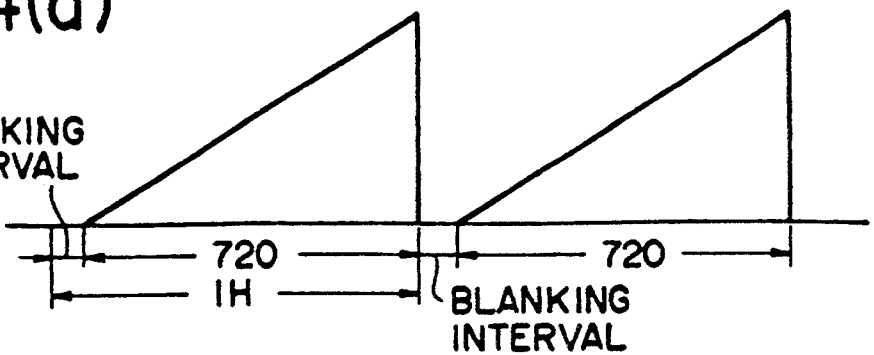
FIGS. 14(a)-14(e) are timing charts of signals for explaining the operation of the display apparatus shown in FIG. 13.
Figure 14B:
Figure 14C:
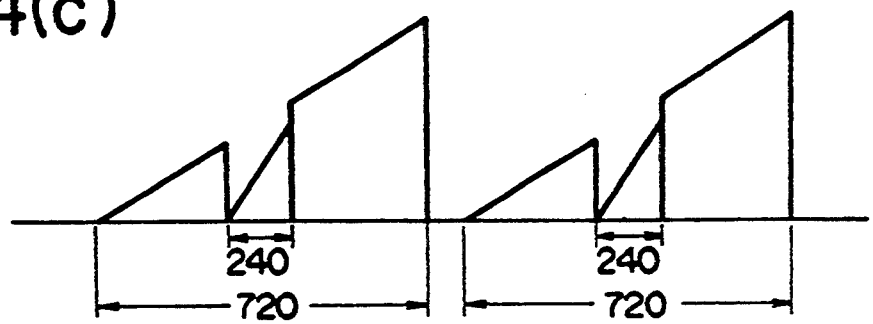
Figure 14D:
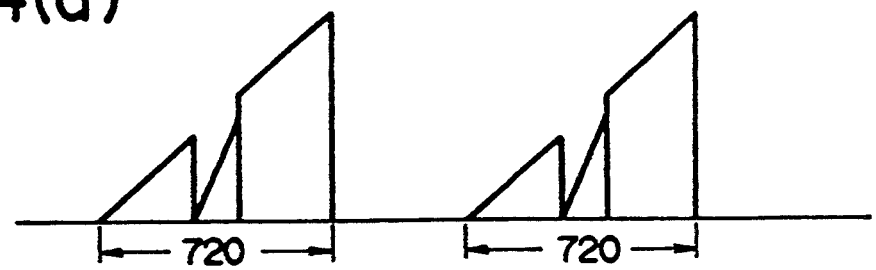
Figure 14E:
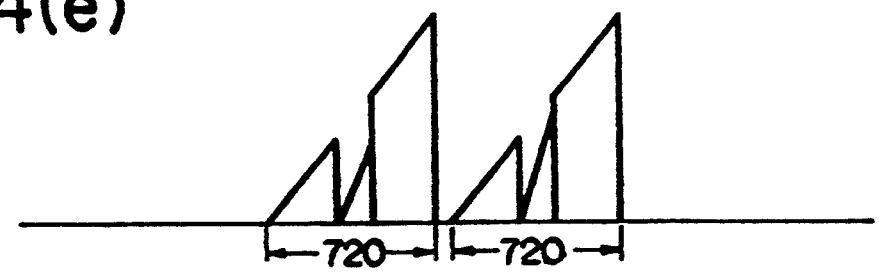
Figure 15:
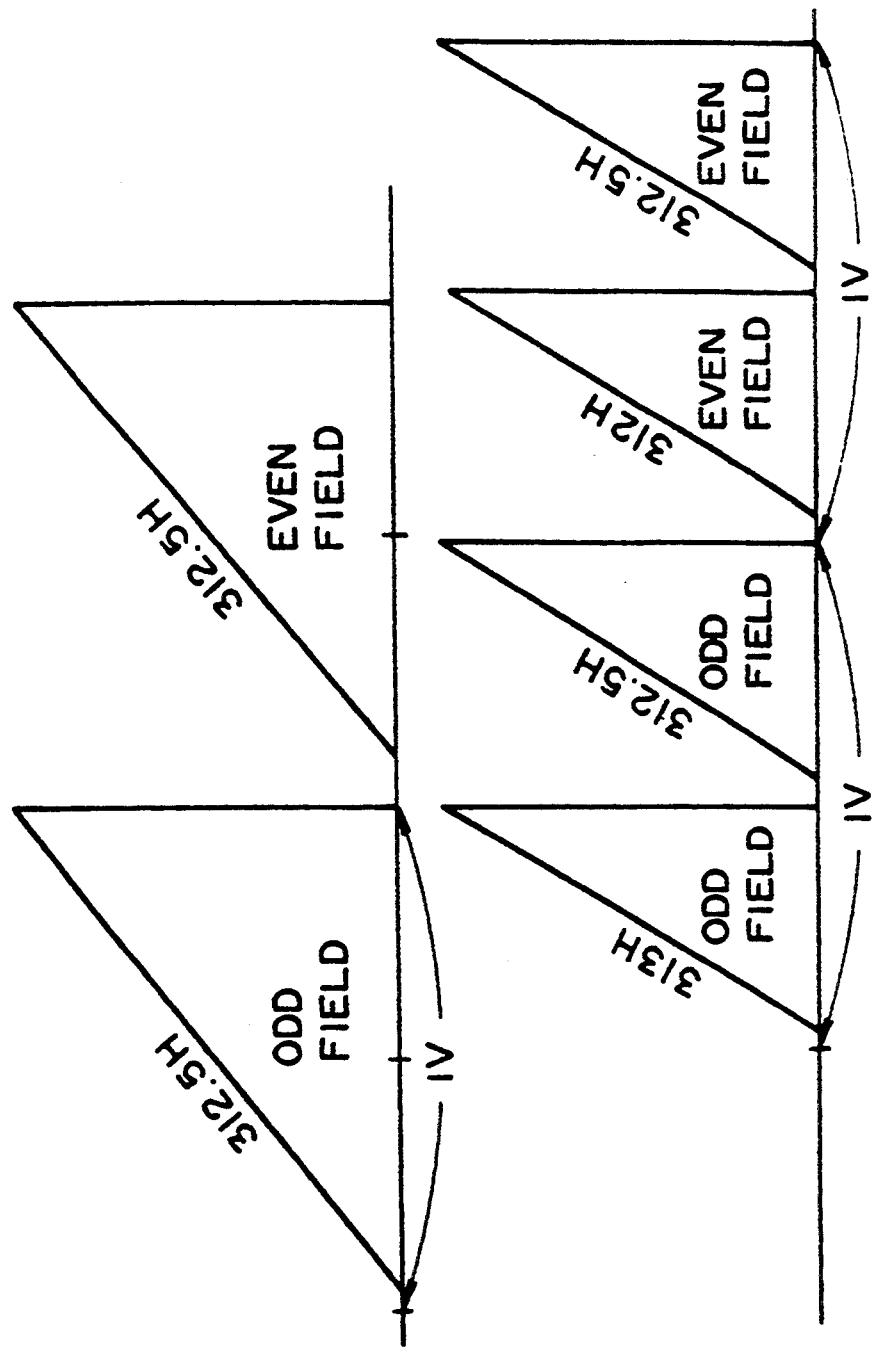
FIG. 15 is another timing chart of signals for explaining the operation of the display apparatus shown in FIG. 13.
Figure 16A:
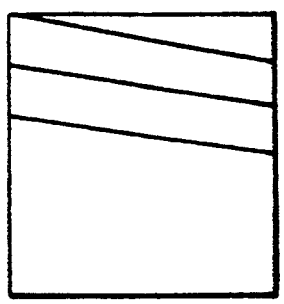
FIGS. 16(a)-16(d) illustrate scanning lines in the conversion of a field frequency in the apparatus of FIG. 13.
Figure 16B:
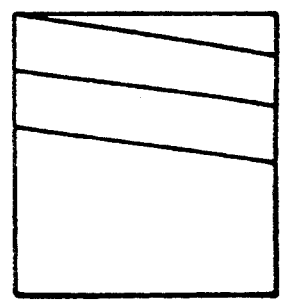
Figure 16C:
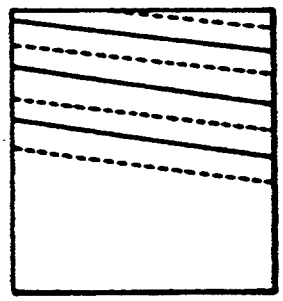
Figure 16D:
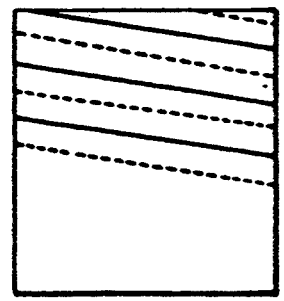
Figure 17A:
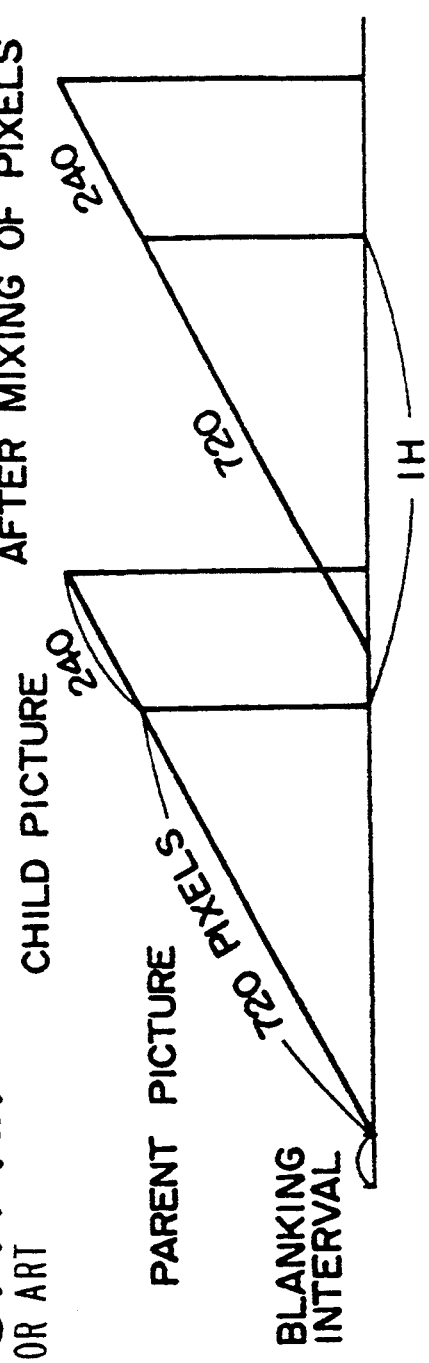
FIGS. 17(a)-17(b) illustrate signals in a PoutP display mode.
Figure 17B:
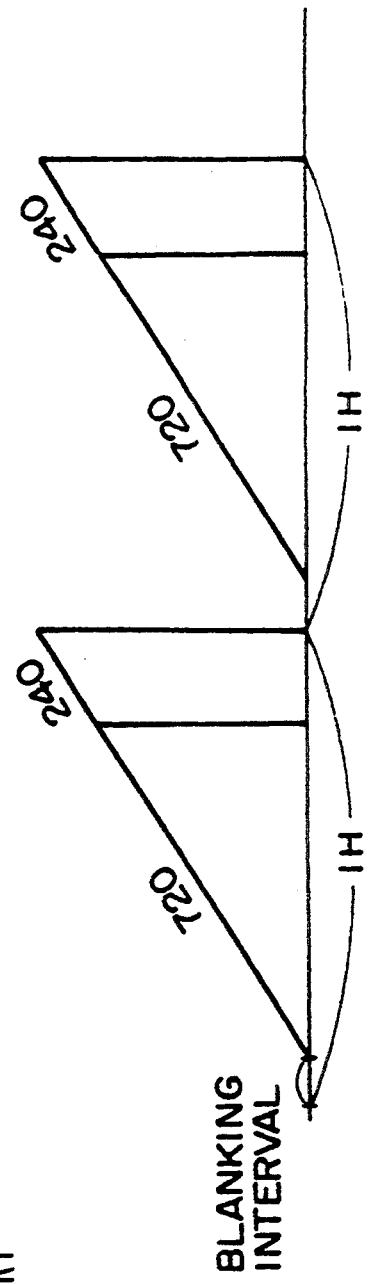

A timing signal generator 59 generates clock pulses SOCY1 (FIG. 8(B)) for reading out the data from the memory 23 shown in FIG. 1 during the logical high level of the H enable signal (FIG. 8(A)) supplied via the AND gate 58, and also generates clock pulses SOCY2 (FIG. 8(C)) for reading out the data from the memory 24 during the same time. Such two clock signals SOCY1 and SOCY2 are so formed that the respective phases are inverse to each other. The timing signal generator 59 further generates a signal SOE (FIG. 8(D)) which is inverse in phase to the H enable signal (FIG. 8(A)) supplied from the AND gate 58. The SOE signal is supplied from the AND gate 58. The SOE signal is supplied to the memories 23 and 24 as an enable signal to permit the data reading when its logical level is low.

FIG. 9 shows an exemplary construction of the detector 70 included in the processor 12. The detector 70 comprises a latch circuit 71 and an inverter 72. The HCLK signal (FIG. 10(A)) generated from the H counter 55 is inputted to a terminal D of the latch circuit 71. The vertical synchronizing signal (FIG. 10(B)) of the parent-picture video signal (prior to the field frequency conversion) outputted from the switch 17 is supplied to the inverter 72. In the case where the field of the main picture is an odd one, the logical level of the HCLK signal is high at the trailing-edge timing of the vertical synchronizing signal. Therefore the Q output of the latch circuit 71 is turned to a logical high level as shown in FIG. 10(C).

When the field of the parent-picture video signal is an even one, the HCLK signal (FIG. 11(A)) at the trailing edge of the vertical synchronizing signal (FIG. 11(B)) has a logical low level as shown, so that the Q output of the latch circuit 71 is turned to a logical low level. Consequently, a detection signal signifying an odd field or an even field of the parent-picture video signal is delivered from the Q output of the input circuit 71.

According to the present invention, as described hereinabove, the parent-picture video signal is synchronized with the child-picture video signal after conversion of the field frequency, so that the storage capacity of the memory means can be minimized in the process of the field frequency conversion.

Furthermore, due to the procedure of synthesizing the parent-picture video signal with the child-picture video signal after conversion of the aspect ratio, a single synthesizing means is sufficient to meet the requirement regardless of any aspect ratio of the main picture.

In addition, discrimination between odd and even fields is executed with respect to the parent-picture video signal prior to the field frequency conversion thereof, whereby a high accuracy is attained in the discrimination with another advantage of simplifying the circuit configuration to eventually reduce the production cost of the apparatus.

What is claimed is:

1. A video display apparatus comprising:
  field frequency converter means for converting a first field frequency of a parent-picture video signal into a second field frequency, of two times the first field frequency and for producing an odd field parent-picture video signal and an even field parent-picture video signal each having the second field frequency;
  aspect ratio converter means for converting an aspect ratio of the odd field parent-picture video signal and the even field parent-picture video signal after field frequency conversion by said field frequency converter means;
  child-picture processor means for generating a child-picture video signal, said child-picture processor including a field frequency converter means for converting a first field frequency of the child-picture video signal into a second field frequency of two times the first field frequency and for producing an odd field child-picture video signal and an even field child-picture video signal each having the second field frequency; and
  synthesizer means for synthesizing a video signal for display from the aspect ratio converted odd field parent-picture video signal, the even field parent-picture video signal, the odd field child-picture video signal, and the even field child-picture video signal, whereby the odd field parent-picture video signal is synchronized with the odd field child-picture video signal and the even field parent-picture video signal is synchronized with the even field child-picture video signal.

2. A video display apparatus receiving a parent-picture video signal having a first aspect ratio, comprising:
  field frequency converter means for converting a first field frequency of the parent-picture video signal having the first aspect ratio into a second field frequency of two times the first field frequency and for producing an odd field parent-picture video signal and an even field parent-picture video signal each having the second field frequency;
  aspect ratio converter means for converting an aspect ratio of the field frequency converted odd field parent-picture video signal and the even field parent-picture video signal from said field frequency converter means to a second aspect ratio;
  selector means for selecting either the parent-picture video signal of said second aspect ratio or the parent-picture video signal of said first aspect ratio received by the display apparatus;
  child-picture processor means for generating a child-picture video signal; and
  synthesizer means for synthesizing a video signal for display from the video signal obtained from said child-picture processor means with the video signal selected by said selector means.

3. A video display apparatus comprising:
  frequency converter means for converting a field frequency of a parent-picture video signal;
  aspect ratio converter means for converting an aspect ratio of the field frequency converted parent-picture video signal from said field frequency converter means to a second aspect ratio;
  memory means for storing a child-picture video signal;
  synthesizer means for synthesizing a video signal for display from the child-picture video signal read out from said memory means and the parent-picture video signal after field frequency conversion by said frequency converter means and aspect ratio conversion by said aspect ratio converter means;
  field detector means for detecting odd fields and even fields with respect to the parent-picture video signal prior to field frequency conversion thereof by said frequency converter means; and
  control means for controlling reading from said memory means in accordance with an output of said field detector means.

* * * * *